(12) United States Patent
Tamura

(10) Patent No.: US 6,920,752 B2
(45) Date of Patent: Jul. 26, 2005

(54) EXHAUST EMISSION CONTROL DEVICE OF INTERNAL-COMBUSTION ENGINE

(75) Inventor: Yasuki Tamura, Nisshin (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 134 days.

(21) Appl. No.: 10/654,471

(22) Filed: Sep. 4, 2003

(65) Prior Publication Data

US 2004/0045277 A1 Mar. 11, 2004

(30) Foreign Application Priority Data

Sep. 5, 2002 (JP) .................................... 2002-260364

(51) Int. Cl.$^7$ .............................................. F01N 3/00
(52) U.S. Cl. ............................ 60/285; 60/274; 60/276; 60/297
(58) Field of Search ........................ 60/274, 276, 285, 60/286, 295, 297, 301

(56) References Cited

U.S. PATENT DOCUMENTS

| 4,401,081 A | * | 8/1983 | Wessel et al. ............... 123/692 |
| 5,577,382 A | * | 11/1996 | Kihara et al. ................. 60/276 |
| 6,192,675 B1 | * | 2/2001 | Hirota et al. ................. 60/286 |
| 6,490,859 B2 | * | 12/2002 | Kakuyama et al. ........... 60/285 |
| 6,499,294 B1 | * | 12/2002 | Katoh et al. .................. 60/301 |
| 6,672,051 B2 | * | 1/2004 | Tamura et al. ................ 60/285 |

FOREIGN PATENT DOCUMENTS

JP 2002-89250 A 3/2002

* cited by examiner

Primary Examiner—Binh Q. Tran
(74) Attorney, Agent, or Firm—Birch, Stewart, Kolasch & Birch, LLP

(57) ABSTRACT

An exhaust emission control device of an internal-combustion engine comprises a three-way catalytic converter provided in an exhaust passage of the internal-combustion engine, and an air-fuel ratio varying element for forcedly varying an air-fuel ratio of exhaust flowing into the three-way catalytic converter, between a rich air-fuel ratio and a lean air-fuel ratio. A variation characteristic altering element for altering a characteristic of the air-fuel ratio variation is provided, and the three-way catalytic converter has a HC selective oxidizing component for selectively oxidizing HC rather than CO, and a CO storage component for storing CO in a reducing atmosphere. The variation characteristic altering element alters a characteristic of the air-fuel variation (such as an A/F variation period) depending on an stored CO quantity correlative value (such as a quantity of flowing-in CO) which correlates with a quantity of CO stored by the CO storage component (S12).

19 Claims, 4 Drawing Sheets

EXHAUST EMISSION CONTROL DEVICE OF INTERNAL-COMBUSTION ENGINE

CROSS-REFERENCE TO THE RELATED ART

This application incorporates by reference the subject matter of Application No. 2002-260364, field in Japan on Sep. 5, 2002, on which a priority claim is based under 35 U.S.C § 119(a).

BACKGROUND OF THE INVENTION

1. Field of the Invention

The invention relates to an exhaust emission control device of an internal-combustion engine, specifically to a technique of increasing efficiency in converting exhaust emissions using a three-way catalyst.

2. Description of the Related Art

As a catalyst for exhaust emission control of an internal-combustion engine for a vehicle, a three-way catalyst is generally used broadly.

Recently, in order to make full use of the capabilities of a three-way catalyst, a three-way catalyst having a so-called $O_2$ storage component (hereinafter abbreviated to "OSC") has been developed. In lean air-fuel ratio operation of an internal-combustion engine, the three-way catalyst having the OSC stores $O_2$, thereby makes a catalytic atmosphere close to a stoichiometric air-fuel ratio temporarily and causes conversion of $NO_x$ in this catalytic atmosphere. Then, in rich air-fuel ratio operation of the internal-combustion engine, the three-way catalyst having the OSC releases the stored $O_2$ and thereby accelerates conversion of HC and CO.

In this type of three-way catalyst having an OSC, A/F variation control in which lean air-fuel ratio operation is forcedly switched over to rich air-fuel ratio operation before the OSC becomes saturated is performed, so that $O_2$ is stored and released repeatedly. By this, HC and CO as well as $NO_x$ can be converted efficiently.

Also, a three-way catalyst having a CO storage component (hereinafter abbreviated to "COSC") has been developed. The three-way catalyst having the COSC accelerates conversion of $NO_x$ by storing CO in rich air-fuel ratio operation, and then releasing the stored CO in lean air-fuel ratio operation (Japanese Unexamined Patent Publication No. 2002-89250).

An experiment carried out by the inventors has confirmed that the three-way catalyst has a characteristic that when A/F variation control is performed, CO rather than HC is selectively converted in rich air-fuel ratio operation. Hence, even the three-way catalyst having an OSC has a problem that HC is not converted satisfactorily in rich air-fuel ratio operation (see FIG. 6).

Recently, for purposes such as improving fuel economy, a vehicle which can perform a so-called fuel cut, namely stopping of supply of fuel to the internal-combustion engine, for example, while decelerating is being developed and put into practical use. However, while a fuel cut is performed, $O_2$ is discharged as it is, so that the $O_2$ storage component easily becomes saturated. Thus, in the case of a three-way catalyst having an OSC, when rich air-fuel ratio operation is performed after resumption of fuel supply, a large quantity of $O_2$ is released at once. Hence, even when the three-way catalyst has a COSC, the catalytic atmosphere becomes a lean atmosphere, which causes a problem called $NO_x$ spike, namely production of a large quantity of $NO_x$.

Under the circumstances, it is thinkable to perform A/F variation control using a three-way catalyst having no OSC. In this case, in rich air-fuel ratio operation, HC rather than CO is converted relatively well, and in rich air-fuel ratio operation performed after resumption of fuel supply, the catalytic atmosphere's becoming a lean atmosphere is prevented.

However, use of a three-way catalyst having no OSC has a problem that CO produced in rich air-fuel ratio operation and $NO_x$ produced in lean air-fuel ratio operation cannot not sufficiently be converted (see FIG. 7).

SUMMARY OF THE INVENTION

The invention has been made to solve the above problems. An object of the invention is to provide an exhaust emission control device of an internal-combustion engine which can prevent $NO_x$ spike in rich air-fuel ratio operation performed after a fuel cut, and can maintain high efficiency in converting $NO_x$, CO and HC.

In order to achieve the object, an exhaust emission control device of an internal-combustion engine according to the invention comprises a three-way catalytic converter provided in an exhaust passage of the internal-combustion engine, and an air-fuel ratio varying element for forcedly varying an air-fuel ratio of exhaust flowing into the three-way catalytic converter, between a rich air-fuel ratio and a lean air-fuel ratio, wherein the exhaust emission control device further comprises a variation characteristic altering element for altering a characteristic of the variation of the air-fuel ratio effected by the air-fuel ratio varying element, the three-way catalytic converter has an HC selective oxidizing component for selectively oxidizing HC rather than CO, and a CO storage component for storing CO in a reducing atmosphere, and the variation characteristic altering element alters a characteristic of the variation depending on an stored CO quantity correlative value which correlates with a quantity of CO stored by the CO storage component of the three-way catalytic converter.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the invention, and wherein.

DETAILED DESCRIPTION OF THE PREFERRED EMBODIMENTS

An embodiment of the invention will be described on the basis of the drawings.

Figure 1:
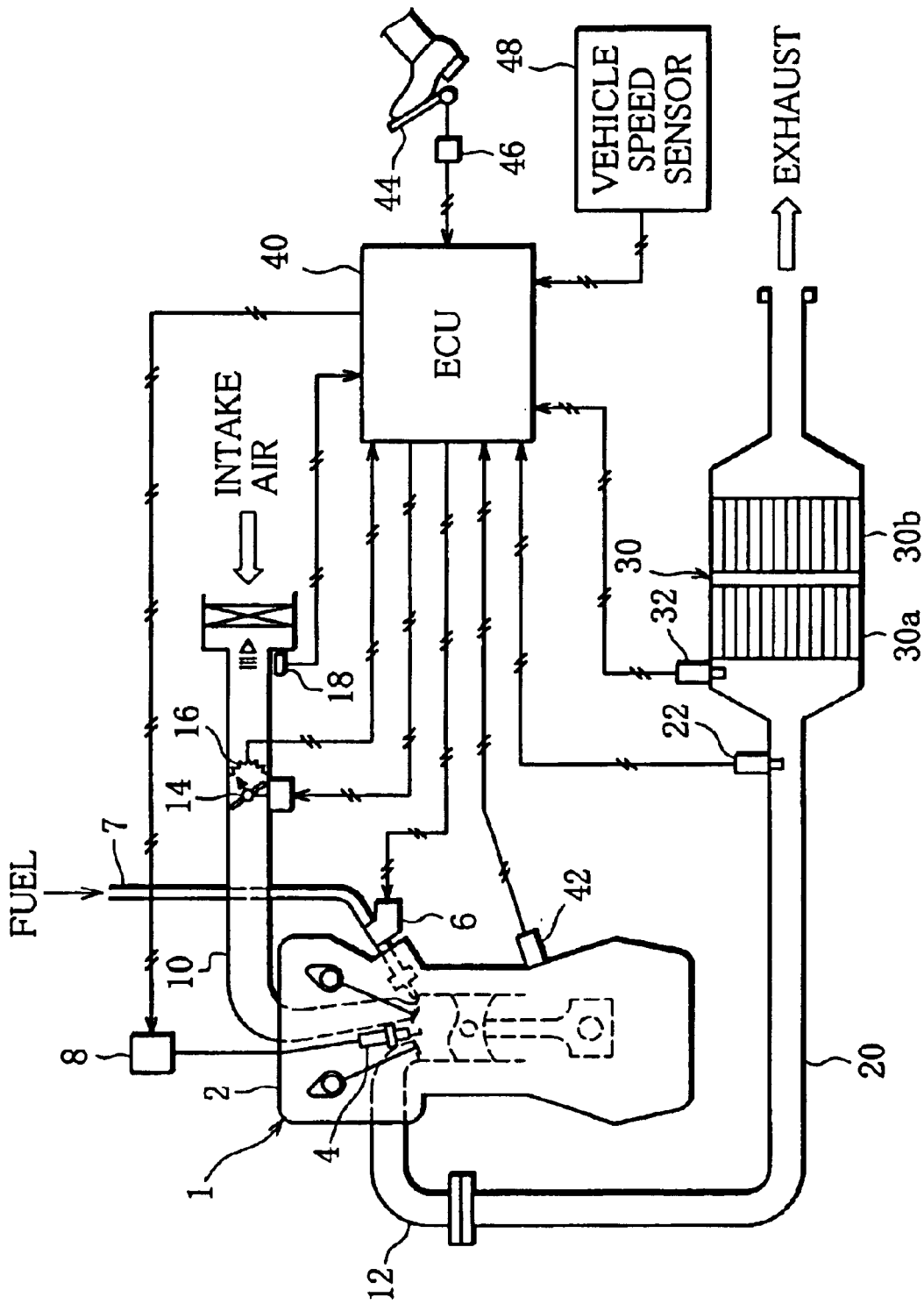
FIG. 1 is a diagram schematically showing structure of an exhaust emission control device of an internal-combustion engine according to the invention, mounted on a vehicle.

FIG. 1 schematically shows structure of an exhaust emission control device of an internal-combustion engine according to the invention, mounted on a vehicle. On the basis of FIG. 1, the structure of the exhaust emission control device according to the invention will be described below.

As shown in FIG. 1, as a basic engine (hereinafter referred to simply as "engine") 1, for example, a cylinder-injection spark-ignition gasoline engine which can perform fuel injection in an intake stroke (intake-stroke injection) or fuel injection in a compression stroke (compression-stroke injection) in accordance with a selected fuel injection mode is adopted. The cylinder-injection engine 1 can easily operate at a lean air-fuel ratio (lean air-fuel ratio operation) in addition to a stoichiometric air-fuel ratio (stoichiometric air-fuel ratio operation) and a rich air-fuel ratio (rich air-fuel ratio operation).

As shown in FIG. 1, for each cylinder, an ignition plug 4 and a solenoid-operated fuel injection valve 6 are attached to a cylinder head 2 of the engine 1 so that fuel can be directly injected into a combustion chamber.

Each ignition plug 4 is connected to an ignition coil 8 which produces high voltage. Each fuel injection valve 6 is connected to fuel supply equipment (not shown) having a fuel tank through a fuel pipe 7. Specifically, the fuel supply equipment has a low pressure fuel pump and a high pressure fuel pump. Thus, the fuel supply equipment can supply fuel held in the fuel tank to each fuel injection valve 6 at a low or high fuel pressure so that each fuel injection valve 6 can inject fuel into the combustion chamber at a desired fuel pressure.

For each cylinder, an intake port is formed to extend through the cylinder head 2 almost vertically. The intake ports are connected to openings of an intake manifold 10 at an end thereof, separately. Also, for each cylinder, an exhaust port is formed to extend through the cylinder head 2 almost horizontally. The exhaust ports are connected to openings of an exhaust manifold 12 at an end thereof, separately.

Since the cylinder-injection engine 1 is already known to the public, a detailed description of its structure will be omitted.

As shown in FIG. 1, in the intake manifold 10, there are provided a solenoid-operated throttle valve 14 for regulating the quantity of intake air, and a throttle position sensor (TPS) 16 for detecting the angle $\theta_{th}$ of the throttle valve 14. Further, an air flow sensor 18 for measuring the quantity of intake air is provided upstream of the throttle valve 14. As the air flow sensor 18, a Karman vortex air flow sensor is used.

To the exhaust manifold 12 is connected an exhaust pipe (exhaust passage) 20. In the middle of the exhaust pipe 20, a three-way catalytic converter 30 is provided as an exhaust emission converting catalytic device.

The three-way catalytic converter 30 has an HC selective oxidizing component, an $O_2$ storage component (OSC), and a CO storage component (COSC). Specifically, the three-way catalytic converter 30 comprises an upstream catalytic part 30a and a downstream catalytic part 30b. The upstream catalytic part 30a has an HC selective oxidizing component, a COSC and an OSC, where the $O_2$ storage capacity of the OSC is low, specifically, lower than the CO storage capacity of the COSC. The downstream catalytic part 30b has an HC selective oxidizing component, a COSC, and an OSC, where the $O_2$ storage capacity of the OSC is relatively high, specifically, equal to or higher than the CO storage capacity of the COSC.

The upstream catalytic part 30a contains in a catalytic carrier at least one active noble metal chosen from platinum (Pt), palladium (Pd) and rhodium (Rh) as the HC selective oxidizing component, a substance forming a carbonate as the COSC, for example, an alkaline-earth metal such as barium (Ba), calcium (Ca) or magnesium (Mg), and a small quantity of cerium (Ce) or zirconium (Zr) as the OSC. The downstream catalytic part 30b contains in a catalytic carrier at least one active noble metal chosen from platinum (Pt), palladium (Pd) and rhodium (Rh) as the HC selective oxidizing component, a substance forming a carbonate as the COSC, for example, an alkaline-earth metal such as barium (Ba), calcium (Ca) or magnesium (Mg), and a relatively large quantity of cerium (Ce) or zirconium (Zr) as the OSC.

Substances usable as the HC selective oxidizing component, the OSC and the COSC are not limited to the above-mentioned ones. For example, the COSC may include nickel (Ni).

In the upstream catalytic part 30a, due to the presence of the active noble metal (Pt, Pd, Rh), HC rather than CO can be selectively oxidized. Further, due to the presence of the alkaline-earth metal (Ba, Ca, Mg or the like) as the COSC, when the air-fuel ratio of exhaust (exhaust A/F) is a rich air-fuel ratio and therefore the catalytic atmosphere is a reducing atmosphere, CO can be stored in the form of a carbonate (for example, $BaCO_3$, $CaCO_3$ or the like), and when the exhaust A/F becomes a lean air-fuel ratio and the catalytic atmosphere becomes an oxidative atmosphere, CO can be released. Further, since the OSC (Ce, Zr) is present though it is small in quantity, when the exhaust A/F is a lean air-fuel ratio and therefore the catalytic atmosphere is an oxidative atmosphere, $O_2$ can be stored, and when the exhaust A/F becomes a rich air-fuel ratio and the catalytic atmosphere becomes a reducing atmosphere, $O_2$ can be released. In the downstream catalytic part 30b, due to the presence of the alkaline-earth metal (Ba, Ca, Mg or the like) as the COSC, when the exhaust A/F is a rich air-fuel ratio and therefore the catalytic atmosphere is a reducing atmosphere, CO can be stored in the form of a carbonate (for example, $BaCO_3$, $CaCO_3$ or the like), and when the exhaust A/F becomes a lean air-fuel ratio and the catalytic atmosphere becomes an oxidative atmosphere, CO can be released. Further, since a large quantity of the OSC (Ce, Zr) is present, when the exhaust A/F is a lean air-fuel ratio and therefore the catalytic atmosphere is an oxidative atmosphere, plenty of $O_2$ can be stored, and when the exhaust A/F becomes a rich air-fuel ratio and the catalytic atmosphere becomes a reducing atmosphere, plenty of $O_2$ can be released.

While in the present case, the upstream catalytic part 30a contains a small quantity of the OSC (Ce, Zr), it may be so arranged that the upstream catalytic part 30a does not contain the OSC (Ce, Zr) at all. Only, containing the OSC is advantageous in that it improves the heat resistance of the upstream catalytic part 30a. Further, while in the present case, both the upstream catalytic part 30a and the downstream catalytic part 30b contain the alkaline-earth metal (Ba, Ca, Mg or the like) as the COSC, it may be so arranged that only one of the upstream catalytic part 30a and the downstream catalytic part 30b contains the alkaline-earth metal (Ba, Ca, Mg or the like).

In the exhaust pipe 20, upstream of the three-way catalytic converter 30, an $O_2$ sensor 22 for detecting an air-fuel ratio on the basis of an oxygen concentration is provided. In the three-way catalytic converter 30, a high temperature sensor (catalyst temperature detecting means) 32 for detecting a catalyst temperature $T_{cat}$ is provided.

Further, an ECU 40 (electronic control unit) 40 including input-output devices, storage devices (ROM, RAM, etc.), a central processing unit (CPU), timer counters and the like is provided. The ECU 40 performs general control on the exhaust emission control device and the engine 1.

To the input side of the ECU 40 are connected various sensors including the above-mentioned TPS 16, air flow sensor 18, $O_2$ sensor 22 and high temperature sensor 32, and other sensors such as a crank angle sensor 42, an acceleration position sensor (APS) 46 for detecting a depression of an accelerator pedal 44 (accelerator angle), and a vehicle speed sensor 48 for detecting a vehicle speed V. The ECU 40 receives detection information from these sensors. An engine speed Ne is calculated on the basis of crank angle information from the crank angle sensor 42.

To the output side of the ECU 40 are connected various output devices including the above-mentioned fuel injection valves 6, ignition coils 8 and throttle valve 14. Thus, when a combustion air-fuel ratio (combustion A/F) is determined on the basis of detection information from the $O_2$ sensor 22 and the like, a command signal regarding an fuel injection quantity and a fuel injection timing is sent to the fuel injection valves 6, a command signal regarding an intake air quantity is sent to the throttle valve 14, and a command signal regarding an ignition timing is sent to the ignition coils 8 in order of combustion, depending on the determined combustion A/F. As a result, the fuel injection valves 6 each inject an appropriate quantity of fuel at an appropriate timing, the throttle valve 14 opens at an appropriate angle, and the ignition plugs 4 each effect spark ignition at an appropriate timing.

The engine 1 is so arranged that while the vehicle is decelerating, a so-called fuel cut, namely stopping of supply of fuel from the fuel injection valves 6 can be performed. Thus, for example, when it is found, on the basis of accelerator angle information from the APS 46 and vehicle speed information V from the vehicle sensor 48, that the accelerator angle is zero and the vehicle speed V is a predetermined value $V_1$ or lower, the ECU 40 stops, in some or all of the cylinders, fuel injection from the injection valves 6. When the accelerator angle becomes a value other than zero or the vehicle speed V becomes a predetermined value $V_2$ or lower ($V_2<V_1$), the ECU resumes fuel injection (resumption of fuel supply).

The function of the exhaust emission control device of the internal-combustion engine having the above-described structure according to the invention will be described below.

In the exhaust emission control device according to the invention, in order to allow the three-way catalytic converter 30 to exhibit its capabilities to the full, the ECU 40 forcedly makes the exhaust A/F oscillate between a rich air-fuel ratio and a lean air-fuel ratio. Specifically, the exhaust A/F is so varied that it is kept at a predetermined lean air-fuel ratio for a predetermined period of time, and then kept at a predetermined rich air-fuel ratio for a predetermined period of time. In other words, the ECU 40 effects air-fuel ratio variation (A/F variation) in which the exhaust A/F periodically varies between a rich air-fuel ratio and a lean air-fuel ratio, with a value close to a stoichiometric air-fuel ratio at the center of variation (air-fuel ratio varying element). Actually, on the basis of detection information from the $O_2$ sensor 22, the ECU 40 forcedly varies the combustion A/F between a rich air fuel ratio and a lean air fuel ratio so that the exhaust A/F will vary between a predetermined rich air-fuel ratio and a predetermined lean air-fuel ratio.

Figure 2:
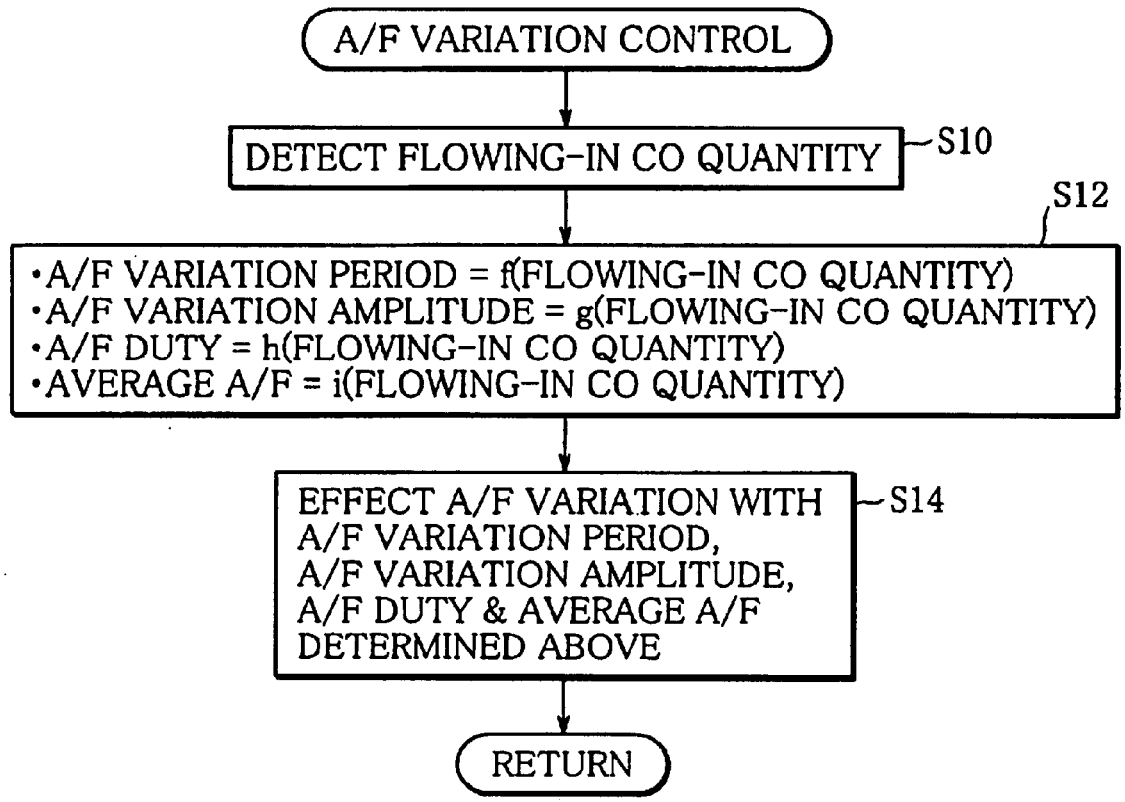
FIG. 2 is a flow chart of a control routine for A/F variation control according to the invention.

FIG. 2 shows a flow chart of a control routine for air-fuel ratio variation control according to the invention. Referring to this flow chart, the air-fuel ratio variation control according to the invention will be described below.

First, at step S10, the quantity of CO flowing into the three-way catalytic converter 30 is detected. Here, for example, relationship between the intake air quantity, the combustion A/F and the flowing-in CO quantity (stored CO quantity correlative value) has been obtained in advance from an experiment or the like in the form of a map, and the flowing-in CO quantity is read from the map (CO quantity detecting means).

Figure 3:
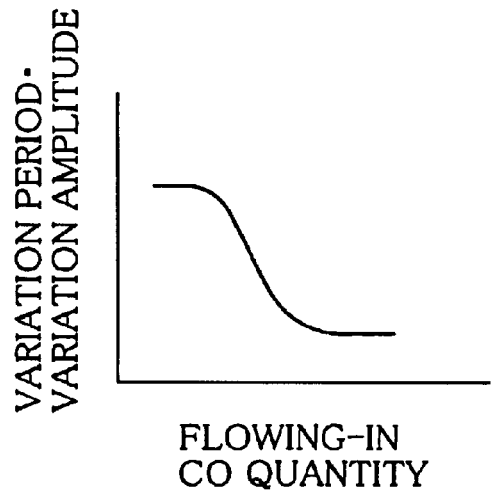
FIG. 3 is a map showing relationship between A/F variation period, A/F variation amplitude and flowing-in CO quantity.

Then, at step S12, on the basis of the flowing-in CO quantity obtained this way, a variation period for the air-fuel variation control (A/F variation period) and a variation amplitude for the air-fuel variation control (A/F variation amplitude) are altered (variation characteristic altering element). Specifically, when the flowing-in CO quantity is larger, the A/F variation period is made shorter and the A/F variation amplitude is made smaller. When the flowing-in CO quantity is smaller, the A/F variation period is made longer and the A/F variation amplitude is made larger. Actually, as shown in FIG. 3, relationship between the A/F variation period, the A/F variation amplitude, and the flowing-in CO quantity has been obtained in advance from an experiment or the like in the form of a map, and the A/F variation period and the A/F variation amplitude are read from the map.

At step S12, on the basis of the flowing-in CO quantity, further an air-fuel ratio duty (A/F duty), namely the ratio of a rich air-fuel ratio period to a lean air-fuel ratio period (reversal time ratio), and an average air-fuel ratio (average A/F) are altered (variation characteristic altering element). In order to convert $NO_x$ efficiently, it is desirable that the average A/F should be a value richer than the stoichiometric air-fuel ratio by 1% or more in terms of air-fuel ratio.

When the exhaust A/F becomes a rich A/F due to the air-fuel ratio control, if the flowing-in CO quantity is large, the quantity of CO may be beyond the CO storage capacity of the COSC of the three-way catalytic converter 30, and CO may flow out without being converted. Hence, here, the A/F variation period, the A/F variation amplitude, the A/F duty and the average A/F are altered on the basis of the flowing-in CO quantity to prevent CO from flowing out.

Since the rich air-fuel ratio period, the lean air-fuel ratio period, and the rich air-fuel ratio and lean air-fuel ratio between which the exhaust A/F should vary are made appropriate this way, especially outflow of CO is prevented, so that the CO conversion efficiency improves. Also, production of $NO_x$ is held down when the exhaust A/F is a lean air-fuel ratio, so that $NO_x$ conversion efficiency improves. Thus, the overall exhaust emission conversion efficiency improves.

Figure 4:
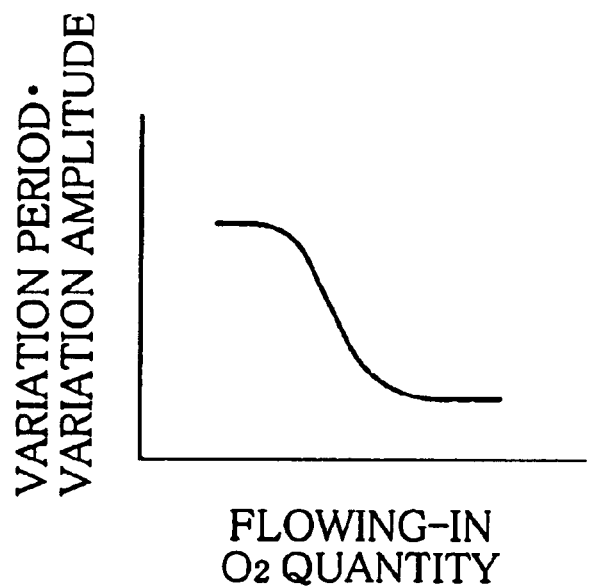
FIG. 4 is a map showing relationship between A/F variation period, A/F variation amplitude and flowing-in $O_2$ quantity.

In the present case, the A/F variation period, the A/F variation amplitude, the A/F duty and the average A/F are altered on the basis of the quantity of CO flowing into the three-way catalytic converter 30. However, the quantity of $O_2$ flowing into the three-way catalytic converter 30 for converting the stored CO when the exhaust A/F is a lean air-fuel ratio is a value which correlates with the CO storage capacity of the COSC (stored CO quantity correlative value). Hence, the A/F variation period, the A/F variation amplitude and the like may be altered on the basis of the flowing-in $O_2$ quantity. Specifically, for example, when the flowing-in $O_2$ quantity is larger, the A/F variation period is made shorter and the A/F variation amplitude is made smaller. When the flowing-in $O_2$ quantity is smaller, the A/F variation period is made longer and the A/F variation amplitude is made larger. In this case, the flowing-in $O_2$ quantity is calculated, for example, on the basis of the intake air quantity and detection information from the $O_2$ sensor 22 ($O_2$ quantity detecting means). Alternatively, a map showing relationship between the A/F variation period, the A/F variation amplitude and the flowing-in $O_2$ quantity as shown in FIG. 4 may be prepared in advance so that the A/F variation period and the A/F variation amplitude can be read from the map. Also in this case, not only outflow of CO is prevented satisfactorily, but also production of $NO_x$ is held down when the exhaust A/F is a lean air-fuel ratio. Hence, the overall exhaust emission conversion efficiency improves.

Figure 5:
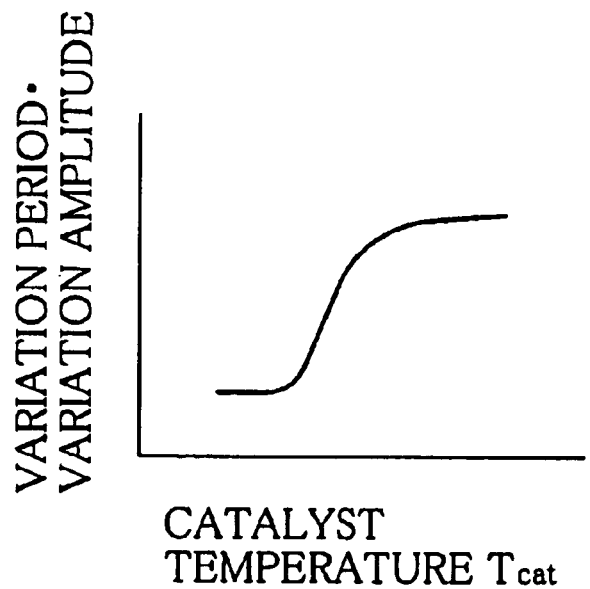
FIG. 5 is a map showing relationship between A/F variation period, A/F variation amplitude and catalyst temperature $T_{cat}$.
Figure 6:
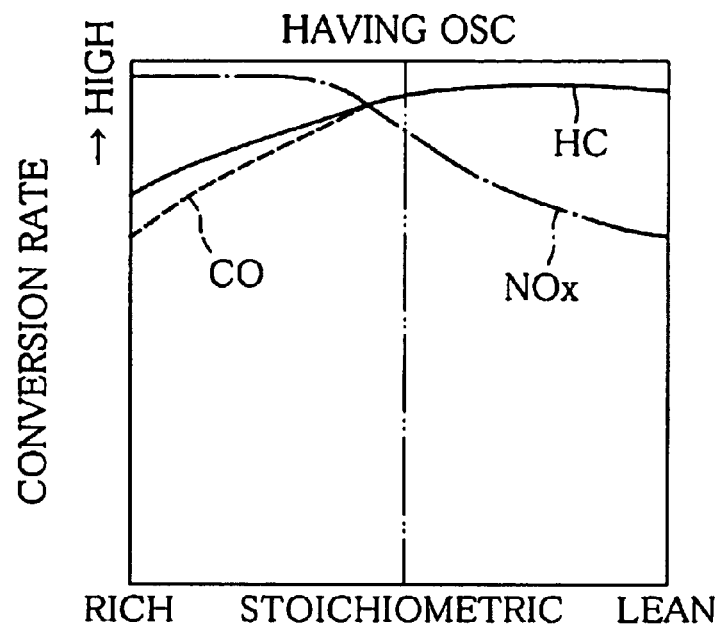
FIG. 6 shows HC conversion efficiency, CO conversion efficiency and $NO_x$ conversion efficiency of a three-way catalyst having an OSC.
Figure 7:
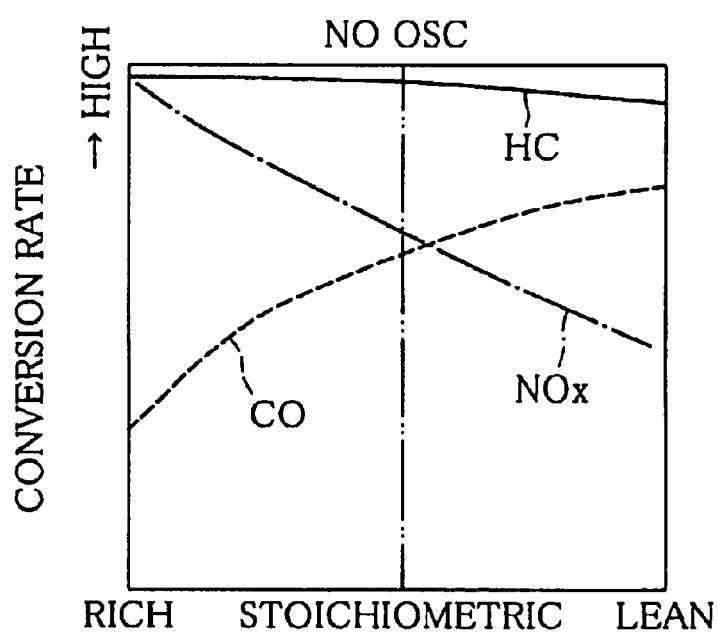
FIG. 7 shows HC conversion efficiency, CO conversion efficiency and $NO_x$ conversion efficiency of a three-way catalyst having no OSC.

Also a catalyst temperature $T_{cat}$ is a value which correlates with the CO storage capacity of the COSC (stored CO quantity correlative value). Hence, the A/F variation period, the A/F variation amplitude, the A/F duty and the average A/F may be altered on the basis of the catalyst temperature $T_{cat}$ detected by the high temperature sensor 32. Specifically, when the three-way catalytic converter 30 is lower in catalyst temperature $T_{cat}$ and less active, the CO storage capacity is lower. Hence, for example, when the catalyst temperature $T_{cat}$ is lower, the A/F variation period is made shorter and the A/F variation amplitude is made smaller. When the catalyst temperature $T_{cat}$ is higher, the A/F variation period is made longer and the A/F variation amplitude is made larger. Also in this case, a map showing relationship between the A/F variation period, the A/F variation amplitude and the catalyst temperature $T_{cat}$ as shown in FIG. 5 may be prepared in advance so that the A/F variation period and the A/F variation amplitude can be read from the map. While in the present case, the catalyst temperature $T_{cat}$ is detected by the high temperature sensor 32, the catalyst temperature $T_{cat}$ may be estimated from an exhaust temperature which is detected, or read from a map which is prepared in advance depending on the accelerator angle, the engine speed Ne and the like.

Further, the A/F variation period, the A/F variation amplitude, the A/F duty and the average A/F may be altered on the basis of a combination of these flowing-in CO quantity, flowing-in $O_2$ quantity and catalyst temperature $T_{cat}$.

While in the present case, the A/F variation period, the A/F variation amplitude, the A/F duty and the average A/F are altered, it may be so arranged that at least one of the A/F variation period, the A/F variation amplitude, the A/F duty and the average A/F is altered.

The CO storage capacity also correlates with an exhaust flow rate and the exhaust A/F. Hence, the A/F variation period, the A/F variation amplitude, the A/F duty and the average A/F may be altered taking these values into consideration.

At step S14, A/F variation is effected on the basis of the A/F variation period, A/F variation amplitude, A/F duty and average A/F which have been determined in the above-described manner.

Hence, in the upstream catalytic part 30*a*, because of the presence of the HC selective oxidizing component and the OSC's low capacity to store $O_2$, HC is oxidized and converted to CO or $CO_2$, satisfactorily. Further, when the exhaust A/F is a rich air-fuel ratio, CO is stored by the COSC, so that the atmosphere in the upstream catalytic part 30*a* is kept close to the stoicheometric air-fuel ratio. When the exhaust A/F becomes a lean air-fuel ratio, CO is released satisfactorily and reacts with $O_2$, so that the atmosphere in the upstream catalytic part 30*a* is likewise kept close to the stoicheometric air-fuel ratio, and CO and $NO_x$ are converted satisfactorily.

In the downstream catalytic part 30*b*, since the $O_2$ storage capacity of the OSC is high, CO which was produced from oxidation of HC in the upstream catalytic part 30*a* is converted by the COSC, satisfactorily. Further, when the exhaust A/F is a lean air-fuel ratio, $O_2$ is stored, so that the atmosphere in the downstream catalytic part 30*b* is kept close to the stoicheometric air-fuel ratio. When the exhaust A/F becomes a rich air-fuel ratio, $O_2$ is released satisfactorily and reacts with CO, so that the atmosphere in the downstream catalytic part 30*b* is likewise kept close to the stoicheometric air-fuel ratio, and especially $NO_x$ is converted satisfactorily.

As described above, in the exhaust emission control device according to the invention, the three-way catalytic converter 30 has an HC selective oxidizing component for selectively oxidizing HC rather than CO and a CO storage component (COSC) for storing CO in a reducing atmosphere. Thus, HC is oxidized and converted to CO or $CO_2$ by the three-way catalytic converter 30, satisfactorily. Further, in rich air-fuel ratio operation of the engine 1, CO is stored in the three-way catalytic converter 30 by the CO storage component. In lean air-fuel ratio operation of the engine 1, the CO which was stored by the CO storage component in rich air-fuel ratio operation is released, so that the catalytic atmosphere becomes an atmosphere close to the stoichiometric air-fuel ratio and CO and $NO_x$ are converted by the three-way catalytic converter 30, satisfactorily.

Especially, a characteristic of the variation of the air-fuel ratio effected by the air-fuel ratio varying element is altered by the variation characteristic altering element, depending on an stored CO quantity correlative value which correlates with a CO storage capacity. Hence, it can be arranged that CO is stored and released repeatedly within the range of the CO storage capacity, and hence, discharge of CO and production of $NO_x$ can be prevented. Thus, the exhaust emission conversion efficiency surely improves.

Besides, the three-way catalytic converter 30 has an $O_2$ storage component (OSC) for storing $O_2$ in an oxidative atmosphere. Thus, in lean air-fuel ratio operation, $O_2$ is stored in the three-way catalytic converter 30 by the $O_2$ storage component, and CO which was stored by the CO storage component in rich air-fuel ratio operation is released, so that the catalytic atmosphere becomes an atmosphere close to the stoichiometric air-fuel ratio. In rich air-fuel ratio operation, CO is stored in the three-way catalytic converter 30 by the CO storage component, and $O_2$ which was stored by the $O_2$ storage component in lean air-fuel ratio operation is released, so that the catalytic atmosphere becomes an atmosphere close to a stoichiometric air-fuel ratio, likewise. Hence, CO and $NO_x$ are converted by the three-way catalytic converter 30, satisfactorily.

Further, the $O_2$ storage capacity of the $O_2$ storage component is lower than the CO storage capacity of the CO storage component. Thus, even when variation control is performed by the air-fuel ratio varying element, the phenomenon that CO rather than HC is selectively converted in rich air-fuel ratio operation is held down, so that HC is oxidized and converted to CO or $CO_2$ by the three-way catalytic converter 30, satisfactorily.

In the case in which the $O_2$ storage capacity is low like this, even if a fuel cut is performed, for example, while the vehicle is decelerating, and then rich air-fuel ratio operation is performed after resumption of fuel supply, release of a large quantity of $O_2$ at once does not happen, and therefore, $NO_x$ spike is prevented. Hence, the exhaust emission conversion efficiency improves after all.

In addition, the three-way catalytic converter 30 comprises a part where the $O_2$ storage capacity of the $O_2$ storage component is low and a part where the $O_2$ storage capacity of the $O_2$ storage component is high. Thus, in the part where the $O_2$ storage capacity of the $O_2$ storage component is low, HC is oxidized and converted to CO or $CO_2$ by the three-way catalytic converter 30 satisfactorily, while in the part where the $O_2$ storage capacity of the $O_2$ storage component is high, $O_2$ is stored and released by the $O_2$ storage component satisfactorily, so that CO and $NO_x$ are converted satisfactorily. Hence, with the simple structure, the exhaust emission conversion efficiency surely improves.

In this case, in this three-way catalytic converter 30, the part where the $O_2$ storage capacity is low is located upstream of the part where the $O_2$ storage capacity is high.

Therefore, in the upstream part where the $O_2$ storage capacity of the $O_2$ storage component is low, HC is oxidized and converted to CO or $CO_2$ by the three-way catalytic converter 30 satisfactorily, and the quantity of $O_2$ stored during a fuel cut is small. In the downstream part where the $O_2$ storage capacity of the $O_2$ storage component is high, $O_2$ is stored and released by the $O_2$ storage component satisfactorily, so that CO including the CO to which HC was converted by oxidation and $NO_x$ are converted satisfactorily. When fuel supply is resumed after a fuel cut, the quantity of $O_2$ released from occlusion in the upstream part is small. Hence, the atmosphere does not become an overly lean atmosphere, and $NO_x$ spike is prevented well. Thus, with the simple structure, the exhaust emission conversion efficiency surely improves.

Further, in this three-way catalytic converter 30, the $O_2$ storage capacity of the part where the $O_2$ storage capacity is low is lower than the CO storage capacity of the CO storage component, and the $O_2$ storage capacity of the part where the $O_2$ storage capacity is high is equal to or higher than the CO storage capacity of the CO storage component.

Therefore, in the upstream part where the $O_2$ storage capacity of the $O_2$ storage component is low, HC is oxidized and converted to CO or $CO_2$ by the three-way catalytic converter 30 more satisfactorily. In the downstream part where the $O_2$ storage capacity of the $O_2$ storage component is high, $O_2$ is stored and released by the $O_2$ storage component more satisfactorily, so that CO including the CO to which HC was converted by oxidation and $NO_x$ are converted more satisfactorily. When fuel supply is resumed after a fuel cut, the quantity of $O_2$ released from occlusion in the upstream part is sufficiently small, so that $NO_x$ spike is prevented better.

In this case, an upstream catalytic part 30a where the $O_2$ storage capacity of the OSC is lower than the CO storage capacity of the COSC is provided on the upstream side thereof. Hence, in the upstream catalytic part 30a, HC can be surely oxidized and converted to CO or $CO_2$ without lowering of the HC conversion efficiency. By performing A/F variation control within the range of the CO storage capacity, CO can be stored and released satisfactorily without outflow of CO, the catalytic atmosphere can be kept close to the stoichiometric air-fuel ratio, and CO and $NO_x$ can be converted satisfactorily. And, downstream of the upstream catalytic part 30a, there is provided a downstream catalytic part 30b where the $O_2$ storage capacity of the OSC is high. Hence, $O_2$ can be stored and released satisfactorily, the catalytic atmosphere can be kept close to the stoichiometric air-fuel ratio more satisfactorily, and CO and $NO_x$ can be surely converted. Thus, the exhaust emission conversion efficiency of the three-way catalytic converter 30 can be surely improved.

When a fuel cut is performed, only air is discharged from a cylinder to which supply of fuel has been stopped. Hence, normally, a large quantity of $O_2$ is stored by the OSC. When supply of fuel is resumed and the exhaust A/F becomes a rich air-fuel ratio, the $O_2$ which has been stored is released at once. Hence, the catalytic atmosphere may become a lean air-fuel ratio temporarily, and so-called $NO_x$ spike, namely production of a large quantity of $NO_x$ may happen. However, in the case in which an upstream catalytic part 30a where the $O_2$ storage capacity of the OSC is lower than the CO storage capacity of the COSC is provided as in the present invention, even when the exhaust A/F becomes a rich air-fuel ratio due to resumption of fuel supply, the phenomenon that the catalytic atmosphere becomes a lean air-fuel ratio temporarily is prevented satisfactorily because the quantity of stored $O_2$ is small. As a result, $NO_x$ spike is surely prevented. Thus, the exhaust emission conversion efficiency of the three-way catalytic converter 30 can be surely improved after all.

Besides, at least one of a variation period, a variation amplitude, a reversal time ratio, and an average air-fuel ratio is altered depending on the stored CO quantity correlative value which correlates with a quantity of CO stored by the CO storage component.

By this, it is easily arranged that CO is stored and released within the range of the CO storage capacity. Thus, discharge of CO and production of $NO_x$ can be prevented, and the exhaust emission conversion efficiency can be surely improved.

In this case, the average fuel-ratio is altered to be a value richer than a stoichiometric air-fuel ratio.

By this, $NO_x$ can be converted more efficiently.

In addition, the variation period is made shorter or the variation amplitude is made smaller when the quantity of CO stored by the CO storage component is larger, and the variation period is made longer or the variation amplitude is made larger when the quantity of CO stored by the CO storage component is smaller.

By this, it can be arranged that CO is stored and released within the range of the CO storage capacity satisfactorily. Thus, discharge of CO and production of $NO_x$ can be prevented, and the exhaust emission conversion efficiency can be surely improved.

Also, The stored CO quantity correlative value is a quantity of CO flowing into the three-way catalytic converter 30. In this case, the variation period is made shorter or the variation amplitude is made smaller when the quantity of CO flowing into the three-way catalytic converter 30 is larger, and the variation period is made longer or the variation amplitude is made larger when the quantity of CO flowing into the three-way catalytic converter 30 is smaller.

By this, on the basis of the quantity of flowing-in CO which is an stored CO quantity correlative value, it can be easily estimated that the quantity of CO which should be stored will be out of the range of the CO storage capacity. By making the variation period shorter or making the variation amplitude smaller when the quantity of flowing-in CO is larger, it can be easily arranged that CO is stored and released within the range of the CO storage capacity. Thus, discharge of CO and production of $NO_x$ can be prevented, and the exhaust emission conversion efficiency can be surely improved.

Further, The stored CO quantity correlative value is a quantity of $O_2$ flowing into the three-way catalytic converter 30. In this case, the variation period is made shorter or the variation amplitude is made smaller when the quantity of $O_2$ flowing into the three-way catalytic converter 30 is larger, and the variation period is made longer or the variation amplitude is made larger when the quantity of $O_2$ flowing into the three-way catalytic converter 30 is smaller.

By this, on the basis of the quantity of flowing-in $O_2$ which is an stored CO quantity correlative value, it can be easily estimated that the quantity of CO which should be stored will be out of the range of the CO storage capacity. By making the variation period shorter or making the variation amplitude smaller when the quantity of flowing-in $O_2$ is larger, it can be easily arranged that CO is stored and released within the range of the CO storage capacity. Thus, discharge of CO and production of $NO_x$ can be prevented, and the exhaust emission conversion efficiency can be surely improved.

Furthermore, The stored CO quantity correlative value is a temperature of the three-way catalytic converter 30. In this case, the variation period is made shorter or the variation amplitude is made smaller when the temperature of the three-way catalytic converter 30 is lower, and the variation period is made longer or the variation amplitude is made larger when the temperature of the three-way catalytic converter 30 is higher.

By this, on the basis of the temperature of the three-way catalytic converter 30 which is an stored CO quantity correlative value, it can be easily estimated that the quantity of CO which should be stored will be out of the range of the CO storage capacity. By making the variation period shorter or making the variation amplitude smaller when the temperature of the three-way catalytic converter 30 is lower, it can be easily arranged that CO is stored and released within the range of the CO storage capacity. Thus, discharge of CO and production of $NO_x$ can be prevented, and the exhaust emission conversion efficiency can be surely improved.

While an embodiment of the invention has been described so far, the invention is not limited to the described embodiment.

For example, in the described embodiment, the three-way catalytic converter 30 is so arranged that the upstream catalytic part 30a and the downstream catalytic part 30b have separate catalytic carriers. However, the upstream catalytic part 30a and the downstream catalytic part 30b may share a single catalytic carrier.

Further, in the described embodiment, both the upstream catalytic part 30a where the $O_2$ storage capacity of the OSC is lower than the CO storage capacity of the COSC and the downstream catalytic part 30b where the $O_2$ storage capacity of the OSC is high are provided. However, the three-way catalytic converter may comprise only a part where the $O_2$ storage capacity of the OSC is low (this includes the case in which no OSC is contained). Also in this case, the invention can have its effects sufficiently.

Further, in the described embodiment, the catalytic part where the $O_2$ storage capacity of the OSC is lower than the CO storage capacity of the COSC (this includes the case in which no OSC is contained) is arranged upstream and the catalytic part where the $O_2$ storage capacity of the OSC is high is arranged downstream. However, also when the positions of these two parts are reversed, the invention can have its effects sufficiently. Only, in order to prevent $NO_x$ spike due to resumption of fuel supply after a fuel cut, it is more effective to arrange a catalytic part where the $O_2$ storage capacity of the OSC is low, on the upstream side as in the above-described embodiment.

Further, in the above-described embodiment, a variation characteristic is altered depending on any of the flowing-in CO quantity, the flowing-in $O_2$ quantity, and the catalyst temperature $T_{cat}$ which are stored CO quantity correlative values so that the quantity of CO will be within the range of the CO storage capacity. When the quantity of CO is within the range of the CO storage capacity, the conversion efficiency is high. Hence, like effects can be produced when a variation characteristic is altered aiming to increase the conversion efficiency. In this case, for example, a specific variation characteristic chosen in advance to increase the conversion efficiency may be used. Alternatively, a variation characteristic may be altered depending on a parameter which correlates with the conversion efficiency (for example, the amplitude of output of the $O_2$ sensor provided downstream of the catalytic converter).

Further, while in the above-described embodiment, a cylinder-injection spark-ignition gasoline engine is adopted as the engine 1, the engine 1 may be a manifold fuel injection gasoline engine or a diesel engine.

What is claimed is:

1. An exhaust emission control device of an internal-combustion engine comprising a three-way catalytic converter provided in an exhaust passage of the internal-combustion engine, and an air-fuel ratio varying element for forcedly varying an air-fuel ratio of exhaust flowing into said three-way catalytic converter, between a rich air-fuel ratio and a lean air-fuel ratio, wherein said exhaust emission control device further comprises a variation characteristic altering element for altering a characteristic of the variation of the air-fuel ratio effected by said air-fuel ratio varying element, said three-way catalytic converter has a HC selective oxidizing component for selectively oxidizing HC rather than CO, and a CO storage component for storing CO in a reducing atmosphere, and said variation characteristic altering element alters a characteristic of said variation depending on an stored CO quantity correlative value which correlates with a quantity of CO stored by said CO storage component of said three-way catalytic converter.

2. The exhaust emission control device according to claim 1, wherein said three-way catalytic converter has an $O_2$ storage component for storing $O_2$ in an oxidative atmosphere.

3. The exhaust emission control device according to claim 2, wherein the $O_2$ storage capacity of said $O_2$ storage component is lower than the CO storage capacity of said CO storage component.

4. The exhaust emission control device according to claim 2, wherein said three-way catalytic converter comprises a part where the $O_2$ storage capacity of said $O_2$ storage component is low and a part where the $O_2$ storage capacity of said $O_2$ storage component is high.

5. The exhaust emission control device according to claim 4, wherein in said three-way catalytic converter, said part where the $O_2$ storage capacity is low is located upstream of said part where the $O_2$ storage capacity is high.

6. The exhaust emission control device according to claim 5, wherein in said three-way catalytic converter, the $O_2$ storage capacity of said part where the $O_2$ storage capacity is low is lower than the CO storage capacity of said CO storage component, and the $O_2$ storage capacity of said part where the $O_2$ storage capacity is high is equal to or higher than the CO storage capacity of said CO storage component.

7. The exhaust emission control device according to claim 1, wherein said variation characteristic altering element alters at least one of a variation period, a variation amplitude, a reversal time ratio, and an average air-fuel ratio.

8. The exhaust emission control device according to claim 7, wherein said variation characteristic altering element alters the average air-fuel ratio to be a value richer than a stoichiometric air-fuel ratio.

9. The exhaust emission control device according to claim 1, wherein said variation characteristic altering element makes the variation period shorter or makes the variation amplitude smaller when the quantity of CO stored by said CO storage component is larger, and makes the variation period longer or makes the variation amplitude larger when the quantity of CO stored by said CO storage component is smaller.

10. The exhaust emission control device according to claim 9, wherein
said stored CO quantity correlative value is a quantity of CO flowing into said three-way catalytic converter, and
said variation characteristic altering element makes the variation period shorter or makes the variation amplitude smaller when the quantity of CO flowing into said three-way catalytic converter is larger, and makes the variation period longer or makes the variation amplitude larger when the quantity of CO flowing into said three-way catalytic converter is smaller.

11. The exhaust emission control device according to claim 9, wherein
said stored CO quantity correlative value is a quantity of $O_2$ flowing into said three-way catalytic converter, and
said variation characteristic altering element makes the variation period shorter or makes the variation amplitude smaller when the quantity of $O_2$ flowing into said three-way catalytic converter is larger, and makes the variation period longer or makes the variation amplitude larger when the quantity of $O_2$ flowing into said three-way catalytic converter is smaller.

12. The exhaust emission control device according to claim 9, wherein
said stored CO quantity correlative value is a temperature of said three-way catalytic converter, and
said variation characteristic altering element makes the variation period shorter or makes the variation amplitude smaller when the temperature of said three-way catalytic converter is lower, and makes the variation period longer or makes the variation amplitude larger when the temperature of said three-way catalytic converter is higher.

13. An exhaust emission control method in an exhaust emission control device of an internal-combustion engine having a three-way catalytic converter in an exhaust passage of the internal-combustion engine, said three-way catalytic converter having an HC selective oxidizing component for selectively oxidizing HC rather than CO, and a CO storage component for storing CO in a reducing atmosphere, wherein exhaust emission control is performed by altering a characteristic of air-fuel ratio variation in which an air-fuel ratio of exhaust flowing into said three-way catalytic converter is forcedly varied between a rich air-fuel ratio and a lean air-fuel ratio, depending on an stored CO quantity correlative value which correlates with a quantity of CO stored by said CO storage component of said three-way catalytic converter.

14. The exhaust emission control method according to claim 13, wherein alteration of a characteristic of said variation is performed in the manner that at least one of a variation period, a variation amplitude, a reversal time ratio, and an average air-fuel ratio is altered.

15. The exhaust emission control method according to claim 14, wherein alteration of a characteristic of said variation is performed in the manner that the average air-fuel ratio is altered to be a value richer than a stoichiometric air-fuel ratio.

16. The exhaust emission control method according to claim 13, wherein alteration of a characteristic of said variation is performed in the manner that when the quantity of CO stored by said CO storage component is larger, the variation period is made shorter or the variation amplitude is made smaller, and when the quantity of CO stored by said CO storage component is smaller, the variation period is made longer or the variation amplitude is made larger.

17. The exhaust emission control method according to claim 16, wherein
said stored CO quantity correlative value is a quantity of CO flowing into said three-way catalytic converter, and
alteration of a characteristic of said variation is performed in the manner that when the quantity of CO flowing into said three-way catalytic converter is larger, the variation period is made shorter or the variation amplitude is made smaller, and when the quantity of CO flowing into said three-way catalytic converter is smaller, the variation period is made longer or the variation amplitude is made larger.

18. The exhaust emission control method according to claim 16, wherein
said stored CO quantity correlative value is a quantity of $O_2$ flowing into said three-way catalytic converter, and
alteration of a characteristic of said variation is performed in the manner that when the quantity of $O_2$ flowing into said three-way catalytic converter is larger, the variation period is made shorter or the variation amplitude is made smaller, and when the quantity of $O_2$ flowing into said three-way catalytic converter is smaller, the variation period is made longer or the variation amplitude is made larger.

19. The exhaust emission control method according to claim 16, wherein
said stored CO quantity correlative value is a temperature of said three-way catalytic converter, and
alteration of a characteristic of said variation is performed in the manner that when the temperature of said three-way catalytic converter is lower, the variation period is made shorter or the variation amplitude is made smaller, and when the temperature of said three-way catalytic converter is higher, the variation period is made longer or the variation amplitude is made larger.

* * * * *